No. 641,878. Patented Jan. 23, 1900.
C. A. A. MONGREDIEN & F. D. BERNIER.
MOTOR CAR.
(Application filed Nov. 21, 1898.)
(No Model.) 4 Sheets—Sheet 1.
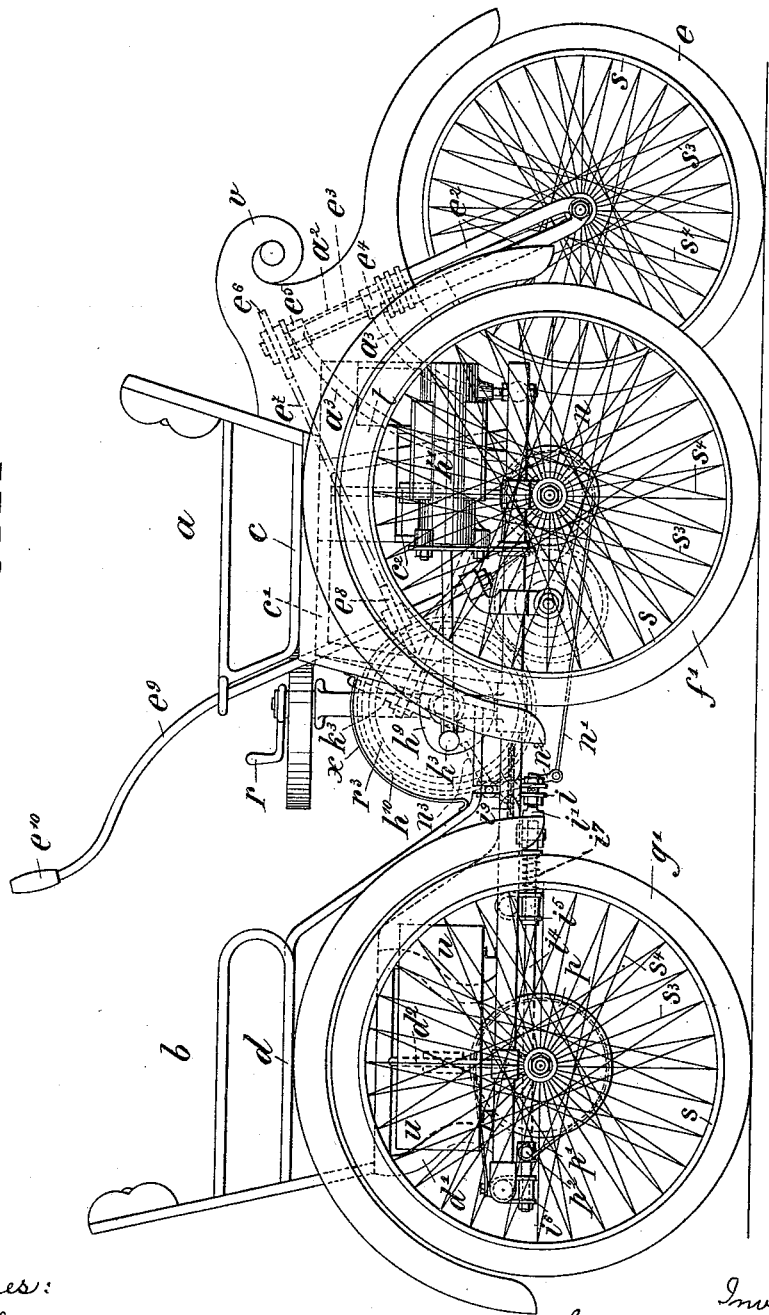

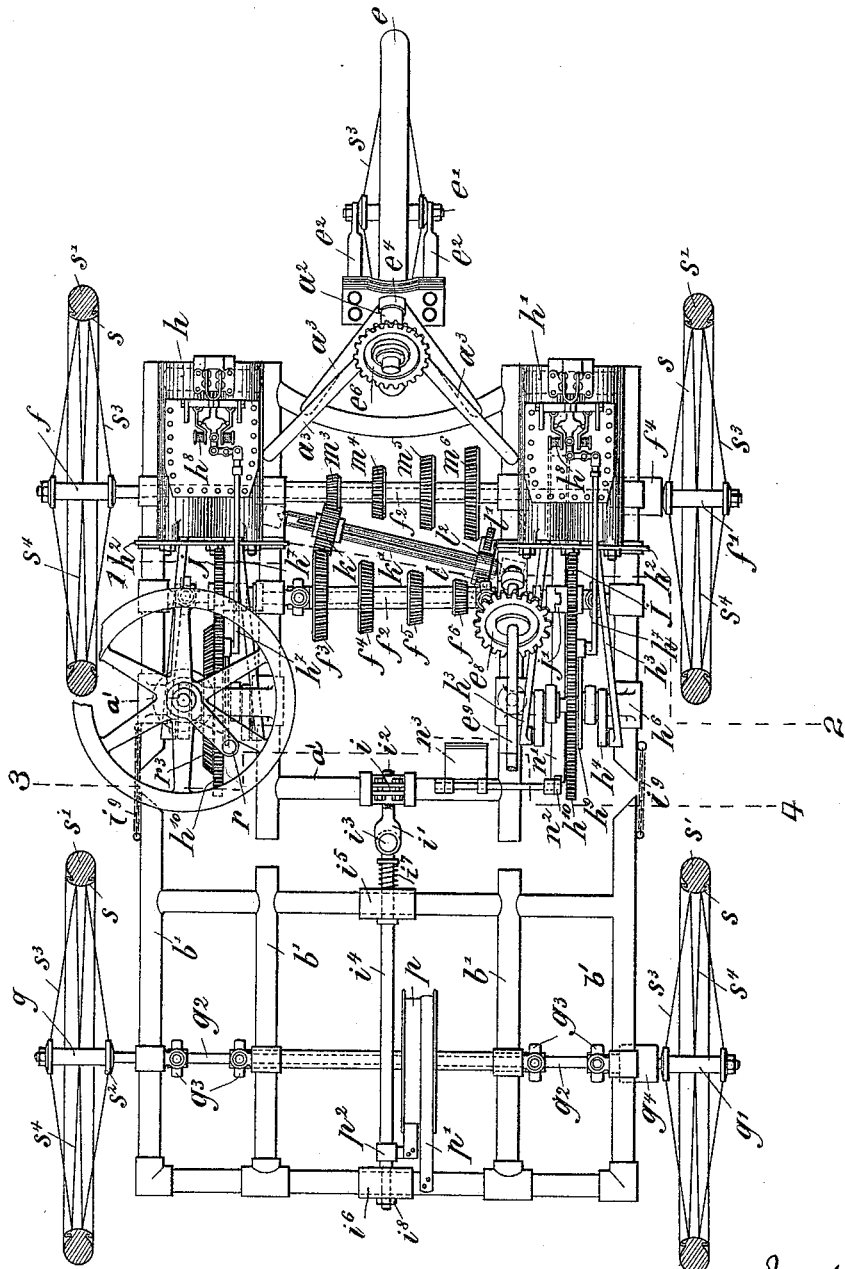

No. 641,878. Patented Jan. 23, 1900.
C. A. A. MONGREDIEN & F. D. BERNIER.
MOTOR CAR.
(Application filed Nov. 21, 1898.)
(No Model.) 4 Sheets—Sheet 3.
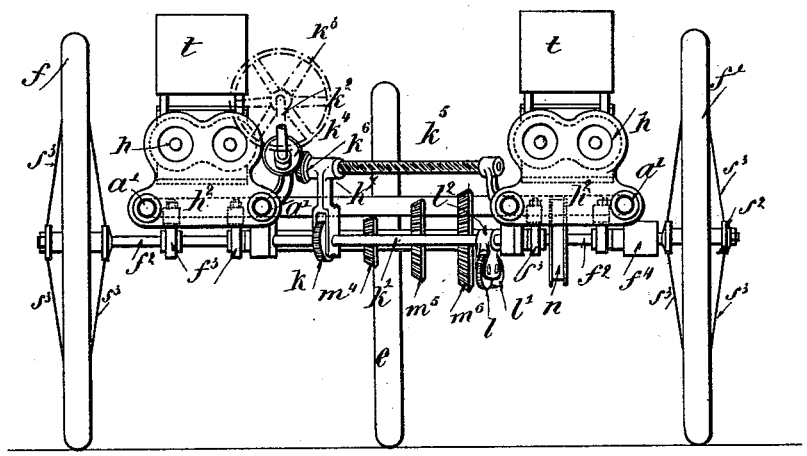
FIG_3_
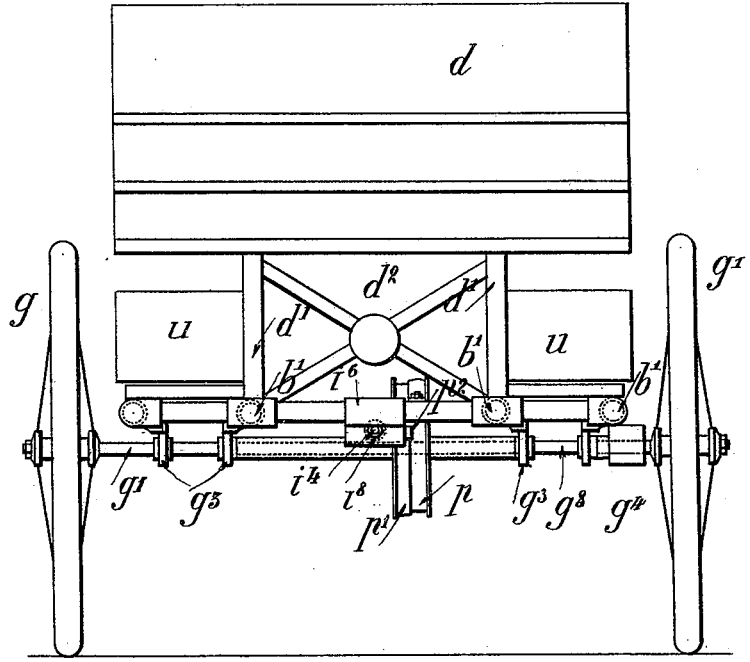
FIG_5_
Witnesses:
C. Holloway
W. C. Pinckney
Inventors:
Clément A. A. Mongredien
François D. Bernier,
By J. E. M. Bowen
Attorney No. 641,878. Patented Jan. 23, 1900.
C. A. A. MONGREDIEN & F. D. BERNIER.
MOTOR CAR.
(Application filed Nov. 21, 1898.)
(No Model.) 4 Sheets—Sheet 4.

Witnesses:
E. Holloway
W. C. Pinckney

Inventors:
Clément A. A. Mongredien
François D. Bernier,
By J. C. M. Bowen
Attorney

THE NORRIS PETERS CO., PHOTO-LITHO., WASHINGTON, D. C.

UNITED STATES PATENT OFFICE.

CLÉMENT ALEXANDRE ALFRED MONGREDIEN, OF LEVALLOIS-PERRET, AND FRANÇOIS DÉSIRÉ BERNIER, OF PARIS, FRANCE.

MOTOR-CAR.

SPECIFICATION forming part of Letters Patent No. 641,878, dated January 23, 1900.

Application filed November 21, 1898. Serial No. 696,981. (No model.)

*To all whom it may concern:*

Be it known that we, CLÉMENT ALEXANDRE ALFRED MONGREDIEN, mechanical engineer, of No. 54 Rue Voltaire, Levallois-Perret, Département de la Seine, and FRANÇOIS DÉSIRÉ BERNIER, banker, of 49 Avenue de l'Observatoire, Paris, in the Republic of France, have invented certain new and useful Improvements in Motor-Cars, of which the following is a specification.

Our invention relates to a five-wheel motor-car the characteristic features of which are its novel form and the arrangements and the novel combinations of its several parts.

The truck or frame, all of metal and resting directly on the axles of the wheels, there being no suspension-springs, is divided into two parts, pivoted together, so as to be capable of adapting themselves without any strain to the inequalities of the ground passed over. One of the parts of the said frame which forms the front and motor part is mounted on three wheels, one of which, placed in line with the longitudinal axis of the car, is the steering-wheel, the two other wheels, placed laterally, being driving and braking wheels. The second part of the underframe or truck forms the rear and carrying part and rests on two carrying and braking wheels. Seats are placed opposite each other on the two parts of the frame. The front part carries two motors symmetrically placed one to the right and the other to the left and capable of operating either together or independently one of the other.

The several parts of our motor-car, and more particularly the underframe, the wheels, the gearing, the brakes, and the steerage, are characterized by their individual construction and by their combination.

The accompanying drawings show the motor-car as a whole and also its several parts.

Figure 4:
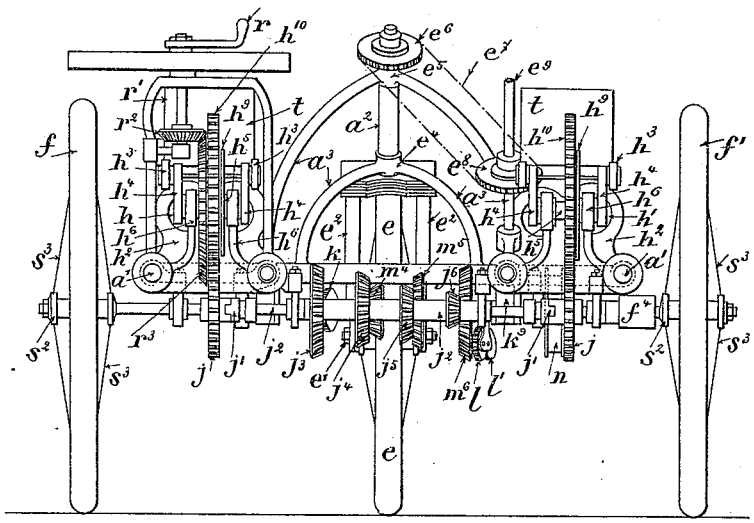
Figure 6:
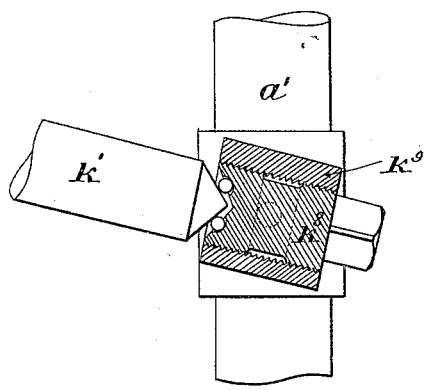
Figure 7:
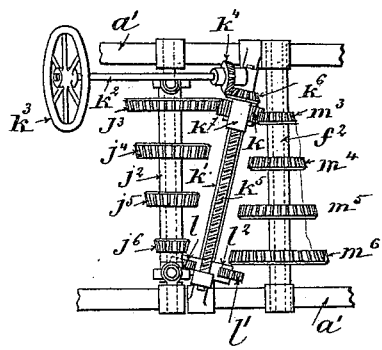

Figure 1 is a side elevation of the motor-car. Fig. 2 is a plan view, the seats being removed. Fig. 3 is a cross-sectional view on the line 1 2 of Fig. 2. Fig. 4 is a cross-sectional view on the line 3 4 of Fig. 2. Fig. 5 is a rear elevation of the rear part of the motor-car. Fig. 6 is a detail of an intermediate gear-shaft. Fig. 7 shows the device for operating changes of speed.

Our motor-car, which we intend to call a "pentacycle" on account of the number of its wheels, consists of an underframe in two parts $a$ $b$, carrying the two seats $c$ $d$, of five wheels $e$ $f$ $f'$ $g$ $g'$, of two motors $h$ $h'$, of gearing for changing the speed, it causing the car to move forward or backward, of a braking device operated by the foot on the front part of the car, of an automatic braking device on the rear part of the car, of a steering device, and of secondary parts, such as water and oil tanks, boxes, supports, and divers accessories. The underframe is made of steel tubes brazed together. The front part $a$ comprises a horizontal frame formed of four horizontal tubes $a'$, solidly braced together, and to which a socket $a^2$, placed in front in an inclined direction, is connected by four curved tubes $a^3$, arranged in triangles. The rear part $b$ of the underframe comprises a frame formed by four tubes $b'$, suitably braced. The two parts of the underframe are connected together by a joint having three axes of rotation, each one of which is perpendicular to the two others for that purpose. The joint three axes of rotation consist of a flanged collar $i$, loosely mounted on the tube $a^4$, bracing the rear part of the frame, of a pair of jaws $i'$, fixed to the collar $i$ by a bolt $i^2$, which serves as a pivot for the jaws, and of a vertical bolt $i^3$, passing through the jaws. The flat head of a horizontal rod $i^4$ is pivoted to the bolt $i^3$. The latter rod $i^4$ is engaged in two supports $i^5$ $i^6$, fixed to the frame $b$ and capable of sliding backward and forward. It is constantly pressed forward by a spring $i^7$, supported on the piece $i^5$; but the movement of the said rod is limited by a nut $i^8$, which strikes against the support $i^6$. Two chains $i^9$ $i^9$, of suitable length, connect the adjacent ends of the outer tubes $a'$ $b'$, so as to limit the angular movements of the two parts of the motor-car and to prevent separation in case the draft-rod $i^4$ should break.

The fore part of the car rests in front on the axle $e'$ of the steering-wheel $e$ through the medium of a fork $e^2$, provided with a steering-tube $e^3$, engaged in the socket $a^2$. Each of the branches of the said fork is formed by two sheaths curved in opposite directions. The four sheaths are united at their upper ends by three plates, through which passes also the steering-tube $e^3$. Two ball-races $e^4 e^5$ make the rotation of the fork easier. On the tube $e^3$ is fixed a toothed pinion $e^6$, which is operated by means of a chain $e^7$. The proper direction is obtained by means of a second pinion $e^8$, on which the chain winds and which is fixedly attached to a crank-shaft $e^9$, provided with a handpiece $e^{10}$ within reach of the hand of the driver. The axle $f^2$ of the driving-wheels $f f'$ is arranged under the frame of the fore part of the motor-car, transversally to the tubes $a'$, and it is connected to these tubes by supports $f^3$, provided with ball-bearings. The axle $g^2$ of the wheels $g g'$ of the rear part of the car is connected in the same manner to the tubes $b'$ by the supports $g^3$, also provided with ball-bearings. Both the axles $f^2 g^2$ are provided with differentials $f^4 g^4$, so as to allow the wheels to turn at different speeds.

The petroleum-essence motors $h h'$, placed at each side of the fore part of the car, are alike. Each motor, fixed to the underframe by supports $h^2 h^2$, comprises two juxtaposed cylinders operating with four pauses, an electric spark igniting the explosive mixture. The pitmen $h^3$ transmit the motion of the pistons to the cranks $h^4$, which are parallel on the main driving-shaft $h^5$, the bearings of which are fixed to the supports $h^6 h^6$, fixed themselves to the underframe. The distributing-rod $h^7$ and the electric igniting device, controlled by the eccentric cam $h^9$, are so arranged that the explosions take place alternatively in the two juxtaposed cylinders. The two motors are independent of each other in that they may be put in operation separately by the transmission-gear and the clutches $j j$; but the motors operate synchronically when both are put in motion.

The starting of the motor is effected by means of the crank-handle $r$, placed within reach of the hand of the driver and fixed to a vertical shaft $r'$, carrying a toothed pinion $r^2$. The said pinion $r^2$ gears with a bevel-wheel $r^3$, fixed on the main driving-shaft $h^5$, so that by turning the crank-handle $r$ the driver, seated in the car, is able to start the motor in giving it several turns in order to begin its motion.

The transmission of motion at a varying speed between each motor and the axle $f^2$ of the wheels of the fore part of the car is obtained by means of a toothed wheel $h^{10}$, fixed on the main driving-shaft, of a pinion $J$, provided with a clutch $j'$, on the secondary shaft $j^2$, of a series of miter-pinions $j^3 j^4 j^5 j^6$, of gradually-decreasing diameters, also fixed on the shaft $j^2$, of a cylindrical pinion $k$, placed on a shaft $k'$, arranged obliquely between the shaft $j^2$ and the axle $f^2$, and of a series of miter-pinions $m^3 m^4 m^5 m^6$, of gradually-increasing diameters, fixed on a sleeve on the axle $f^2$.

The pinion $k$ is capable of movement along the shaft $k'$, so as to come successively in gear with two corresponding pinions $j^3$ and $m^3$, $j^4$ and $m^4$, $j^5$ and $m^5$, and $j^6$ and $m^6$; but its rotary movement is communicated to its shaft $k'$ by means of a longitudinal groove, in which engages a projection on the pinion $k$. The device for controlling the change of speed is shown in plan in Fig. 7. It consists of a rod $k^2$, carrying a hand-wheel $k^3$, and a miter-pinion $k^4$, of a screw-threaded shaft $k^5$, arranged obliquely and above the shaft $k'$, of a miter-pinion $k^6$, fixed on the shaft $k^5$ and gearing with the pinion $k^4$, and of a socket $k^7$, forming a nut, mounted on the shaft $k^5$ and having a lower extension in the shape of a fork which straddles the pinion $k$. By turning the hand-wheel $k^3$ the shaft $k^5$ is rotated, which determines the displacement of the socket $k^7$, whereby the pinion $k$ may be caused to occupy all the positions comprised, on the one hand, between the pinions $j^3$ and $m^3$, which correspond to the highest speed, and, on the other hand, between the pinions $j^6$ and $m^6$, which give the lowest speed. Transmission of motion ceases each time the pinion $k$ is placed between two successive pairs of gear-wheels, so that it is always possible to change instantaneously the speed to whatever speed should the position of the pinion $k$ correspond. The two clutches $j' j'$ also permit of transmitting the motion at any moment of either the one or the other motor or of both the motors together.

Transmission of motion to move the motor-car backward is obtained by two pinions $l$ and $l'$ in gear with each other and loosely mounted on a support $l^2$, loosely suspended from the intermediate shaft $k'$, and which may be displaced along the said shaft by means of a lever operated by hand. The said pinions may be brought into gear with the pinions $j^6$ and $m^6$ or moved out of gear with the same at will.

In view of facilitating the mounting of the shaft $k'$ and of reducing friction to a minimum each of the ends of the said shaft (see Fig. 6) terminates in a conical point rolling on balls in a bowl $k^8$, having a conical recess to center the said point and screwing into a screw-threaded support $k^9$, so as to be easily tightened to the proper degree.

The brakes are two in number. The first one comprises a pulley $n$, fixedly attached to the axle $f^2$ of the driving-wheels, and a flexible braking-strip $n'$, attached, on the one part, to the underframe of the fore part of the motor-car, and, on the other hand, to a bell-crank lever $n^2 n^3$, the arm $n^3$ of which is arranged in the shape of a pedal near the foot of the driver. The said brake operates when the pedal $n^3$ is depressed. The second brake is formed by a pulley $p$, fixedly attached to the axle $g^2$ of the carrying-wheels, and a flexible strip $p'$, attached at one end to the frame $b$ and the other end to a support $p^2$, fixedly attached to the draft-rod $i^4$. With this arrangement the brake operates under the effect of the relative forward displacement of the frame $b$ with respect to the draft-rod $i^4$, such displacement taking place automatically each time the rear part of the motor-car tends to be thrown forward against the fore part of the car on account of the sudden stopping of the said fore part.

The wheels of the car are formed of a hollow metal rim $s$, provided with an elastic cover or pneumatic tube $s'$ and connected to the hub $s^2$ by direct spokes $s^3$ and strengthened by wire rods $s^4$, each of which connects two almost diametrically-opposed points of the said rim. The rods $s^4$ are all tangents of a circle of small diameter and which is concentric to the wheel, the said rods being independent of the hub. The ends of the spokes $s^3$ and of the rods $s^4$ on the rim are arranged in quincunx or the form of a V along two parallel circumferences situated on each side of the central plane of the wheel, the ends of each of the rods $s^4$ diagonally on the two circumferences. On account of this arrangement the diagonal rods form a system of triangulation of the rim in a direction which is parallel to the wheel and in the perpendicular development of the latter. Both the spokes and the diagonal rods are fixed to the rim of the wheel by means of suitable nuts, which allow of adjusting the tension of said spokes or rods. The two systems formed by the spokes $s^3$ and the rods $s^4$ are independent of each other.

The two seats $c$ and $d$ are mounted on the underframe without intermediate springs. They are fixed to the supports $c'$ $d'$, having braces or cross-pieces $c^2 d^2$, forming triangles. The underframe carries also an essence-tank $t$ above each of the motors and cold-water tanks $u$ placed in the rear.

Above the steering-wheel is arranged an ornamental cover which hides from view the chain and steering-pinion, and another cover $x$ protects the gearing and other parts of the motors for transmitting motion.

The motor-car presents only a very small surface in front, and thus meets with but very little resistance from the air. The construction of the underframe in steel tubes, the almost complete absence of body, and the metal structure of the wheels give great lightness to the motor-car. The ball-bearings with which the axles of the wheels are provided also contribute to diminish the pull required to propel the car.

The particular connection between the fore and rear part causes the underframe to be quite free to adapt itself to all inequalities in the ground traveled over, none of the wheels ever getting off the ground and the car being able to turn on a very sharp curve.

The use of the pulling power of the fore part of the motor-car confers the advantage of turning very short and at a comparatively high speed without tearing up the ground by the wheels and also of preventing vibration of the rear part of the car where the persons driving are seated. Steering is made easy by the use of ball-bearings for the steering-fork.

The faculty of modifying the proportion of the transmission of motion by means of the multiplying-gear and of increasing at will the speed of either motor and also the faculty of regulating the motive power by means of the frequency of the igniting-sparks, as in ordinary essence-motors, give every facility for regulating the speed of the motor-car.

The cessation of the transmission of motion which may be instantaneously operated by moving the pinion $k$, whatever the speed may be, and the brake operated by foot and which acts direct on the fore part, allows of bringing the car to a stop in a very short distance. The brake, acting on the rear part, comes into operation each time the fore part stops suddenly and automatically prevents the two parts of the motor-car from being brought violently together.

Lastly, as the motor-car is mechanically constructed in all its parts, the driver or motorman will always be able to make repairs in case of accident without the help of a coach-builder.

Any motor capable of being fitted to the fore part of the car in such a manner as to operate the secondary gear-shaft $j^2$ either directly or by the medium of pitmen, cranks, gearing, or other transmitting devices may be employed instead of the essence-motors shown in the drawings, and the clutch may be modified in consequence without any characteristic change being made in the general construction of the car or in the mode of operation of the same. We reserve, moreover, to ourselves the right of modifying the forms and dimensions of the constitutive parts of our motor-car, of increasing or decreasing the number of gear-wheels for changing the speed, of adapting any suitable arrangement for operating the change of speed, of using a clutch for each of the motors or for one only, and, in general, of adopting any modification which may not interfere with the principle of our invention.

We claim—

1. In a motor-car, as described, a pivot or joint, having three axes of rotation, to connect together the two parts of the underframe in such a manner that the latter is capable of adapting itself, without effort or strain, to the inequalities of the ground traveled over, and to all the curves or turns of the road, substantially as described.

2. In a motor-car, as described, gearing for transmitting motion at variable speed and located between two parallel shafts, and comprising a series of miter-pinions of different diameters and fixedly attached to one of the said parallel shafts, a series of miter-pinions fixed opposite the first-named miter-pinions and on the second shaft, but being of such diameters that the interval or space between the corresponding pinions remains always the same, an intermediate shaft arranged obliquely in the same plane as the two first-named shafts and loosely mounted in its bearings, and a cylindrical pinion movable along the said intermediate shaft in such a manner as to be capable of gearing successively with the different pairs of corresponding miter-pinions, each of which corresponds to a different proportion of motion transmitted, substantially as described.

3. In a motor-car, as described, in combination with a motion-transmitting device located between two parallel shafts and composed of a pinion mounted on an intermediate shaft, a reversing device for propelling the car in an opposite direction and composed of two pinions gearing together and loosely mounted in a support which is movable along the said intermediate shaft in such a manner as to allow the said pinions to gear with any pair of pinions fixed on the parallel shafts, substantially as described.

4. In a motor-car, as described, a shaft revolving on points the conical ends of which are supported by ball-race bowls having each a conical recess to center the point of the said shaft, and a groove in which is housed a ball-race rim having balls on which rests the conical surface of the said point, the said ball-race bowls being provided with external screw-threads, which allow of adjusting or regulating the pressure between the said balls and the said points of the shaft, substantially as described.

5. In a motor-car, as described, in combination with an underframe comprising a driving fore part and a carrying rear part, a brake acting automatically on the said rear part to prevent it from being violently thrown against the fore part when the latter is suddenly brought to a stop or reduced in speed, the said brake being operated by a pull-rod connecting the rear and fore parts together and capable of moving forward or backward with respect to the said rear part, substantially as described.

6. In a motor-car, in combination, a speed-changing mechanism which comprises a pinion movable along a shaft and adapted to mesh with pairs of gear-wheels, each corresponding with a different ratio of transmission, a fork engaging with said pinion, a joint-socket $k^7$, an endless screw $k^5$ placed parallel with and above the shaft of the intermediate pinion, and gear-wheels for revolving said endless screw, and the seat of the motor-car.

Signed at Paris, in the Republic of France, this 7th day of November, 1898.

CLÉMENT ALEXANDRE ALFRED MONGREDIEN.
FRANÇOIS DÉSIRÉ BERNIER.

Witnesses:
   EUGÈNE WATTIER,
   MAURICE FOUARD.